(12) United States Patent
Mai et al.

(10) Patent No.: US 10,102,172 B1
(45) Date of Patent: Oct. 16, 2018

(54) METHOD AND APPARATUS FOR PERFORMING A SINGLE PASS COMPILATION FOR SYSTEMS WITH DYNAMICALLY RECONFIGURABLE LOGIC BLOCKS

(71) Applicant: Altera Corporation, San Jose, CA (US)

(72) Inventors: Kevin W. Mai, San Jose, CA (US); Vishwas Tumkur Vijayendra, Santa Clara, CA (US); Jakob Raymond Jones, San Jose, CA (US)

(73) Assignee: Altera Corporation, San Jose, CA (US)

( * ) Notice: Subject to any disclaimer, the term of this patent is extended or adjusted under 35 U.S.C. 154(b) by 310 days.

(21) Appl. No.: 14/979,454

(22) Filed: Dec. 27, 2015

(51) Int. Cl.
*G06F 17/50* (2006.01)
*G06F 13/40* (2006.01)
*G06F 1/12* (2006.01)

(52) U.S. Cl.
CPC ............ *G06F 13/4054* (2013.01); *G06F 1/12* (2013.01); *G06F 13/4022* (2013.01); *G06F 17/505* (2013.01); *G06F 17/5031* (2013.01); *G06F 17/5072* (2013.01); *G06F 2217/84* (2013.01)

(58) Field of Classification Search
CPC ............... G06F 17/505; G06F 17/5031; G06F 17/5072; G06F 2217/84
See application file for complete search history.

(56) References Cited

U.S. PATENT DOCUMENTS 7,007,254 B1 * 2/2006 Borkovic ............ G06F 17/5031
716/113

* cited by examiner

*Primary Examiner* — Ernest Unelus
(74) *Attorney, Agent, or Firm* — Compass IP Law PC

(57) ABSTRACT

A method for designing a system on a target device includes generating a timing netlist that reflects timing delays and timing relationships of a base configuration of a block in the system and a target configuration of the block in the system, wherein the base configuration of the block and the target configuration of the block implement different functionalities, and performing synthesis, placement, and routing on the system in response to the timing netlist.

18 Claims, 9 Drawing Sheets

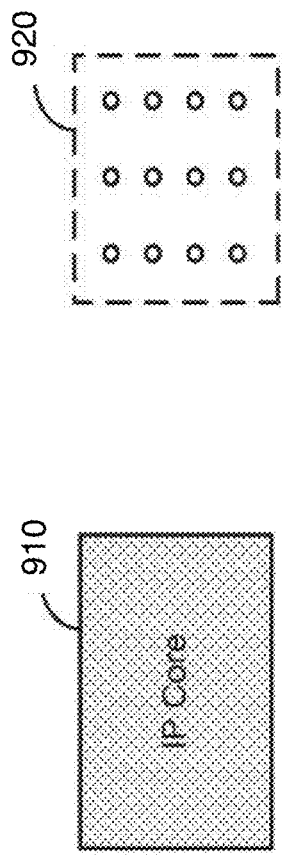
FIG. 9A
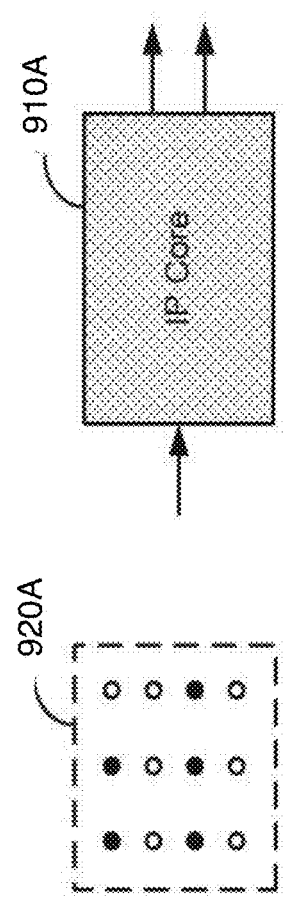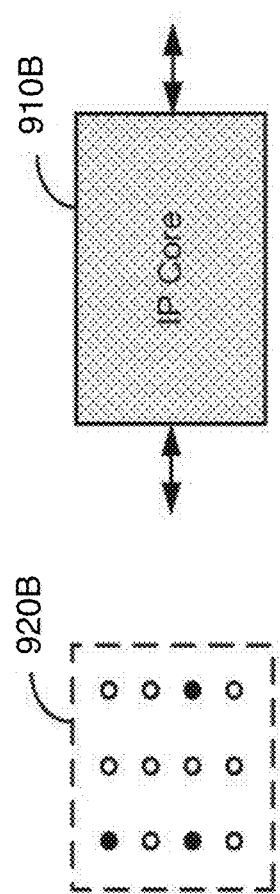
FIG. 9B

METHOD AND APPARATUS FOR PERFORMING A SINGLE PASS COMPILATION FOR SYSTEMS WITH DYNAMICALLY RECONFIGURABLE LOGIC BLOCKS

FIELD

Embodiments of the present invention relate to tools for designing systems on target devices. More specifically, embodiments of the present invention relate to a method and apparatus for performing a single pass compilation for systems with dynamically reconfigurable logic blocks.

BACKGROUND

Target devices such as field programmable gate arrays (FPGAs), structured application specific integrated circuits (ASICs), and ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow is hardware description language (HDL) compilation. HDL compilation involves performing synthesis, placement, routing, and timing analysis of the system on the target device.

Some target devices include dynamically reconfigurable logic blocks. Dynamically reconfigurable logic blocks are modifiable to perform alternative functionalities while other parts of the system are operating. Dynamically reconfigurable logic blocks typically implement independent sections of the system that need not be active during an entire application runtime. By realizing hardware sharing, a system utilizing dynamically reconfigurable logic blocks may benefit from a reduction in device count, power consumption, and cost. Compared to static reconfigurable logic blocks, dynamically reconfigurable logic blocks offer the added advantage of allowing unaffected portions of a system to continue to operate during reconfiguration without loss of performance or functionality.

When creating and optimizing a design for a system that includes dynamically reconfigurable logic blocks on a target device, many EDA tools take into consideration only an initial configuration of dynamically reconfigurable logic when performing timing analysis.

SUMMARY

A method for performing timing closure on dynamically reconfigurable logic blocks in a single hardware description language (HDL) compilation is disclosed. Information related to timing delays and timing relationships of a base configuration and one or more target configurations of the dynamically reconfigurable logic blocks are identified. The base configuration may be an initial runtime configuration of a dynamically reconfigurable logic block. According to an embodiment of the present invention, the timing relationships may include setup and hold requirements to correctly latch data into a register, and recovery and removal requirements to correctly de-assert resets and presets. The information may be identified from input provided by a user or from files associated with the dynamically reconfigurable logic blocks. This allows timing constraints to reflect different clock paths for the base configuration and all intended target configurations of the dynamically reconfigurable logic blocks. This also allows for the compilation to include interface timing paths for the base configuration and all intended target configurations. As a result, this reduces the designer's effort to constrain timing paths interfacing the dynamically reconfigurable logic blocks and subsequently reduces development time.

According to an embodiment of the present invention, a method for designing a system on a target device includes generating a timing netlist that reflects timing delays and timing relationships of a base configuration of a block in the system and other target configurations of the block in the system. The block is a dynamically reconfigurable logic where a base configuration of the block and the target configuration of the block implement different functionalities. Synthesis, placement, and routing on the system are performed in response to the timing netlist. The timing netlist identifies delays and timing relationships associated with components and interconnects on a first path through the block during the base configuration, and delays associated with components and interconnects on a second path through the block during the target configuration. According to an aspect of this embodiment, generating the timing netlist includes adding new paths for each configuration of the block to the timing netlist. Different paths from each configuration of the path are identified. For each different path identified, the different path is either treated as a new path or treated as a pre-existing path while associating a worst case timing for the pre-existing path.

BRIEF DESCRIPTION OF THE DRAWINGS

The features and advantages of embodiments of the present invention are illustrated by way of example and are not intended to limit the scope of the embodiments of the present invention to the particular embodiments shown.

FIG. 9A illustrates a dynamically reconfigurable logic block and its corresponding configuration registers according to an exemplary embodiment of the present invention.

FIG. 9B illustrates examples of different configurations of a dynamically reconfigurable logic block as programmed by

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

Figure 1:
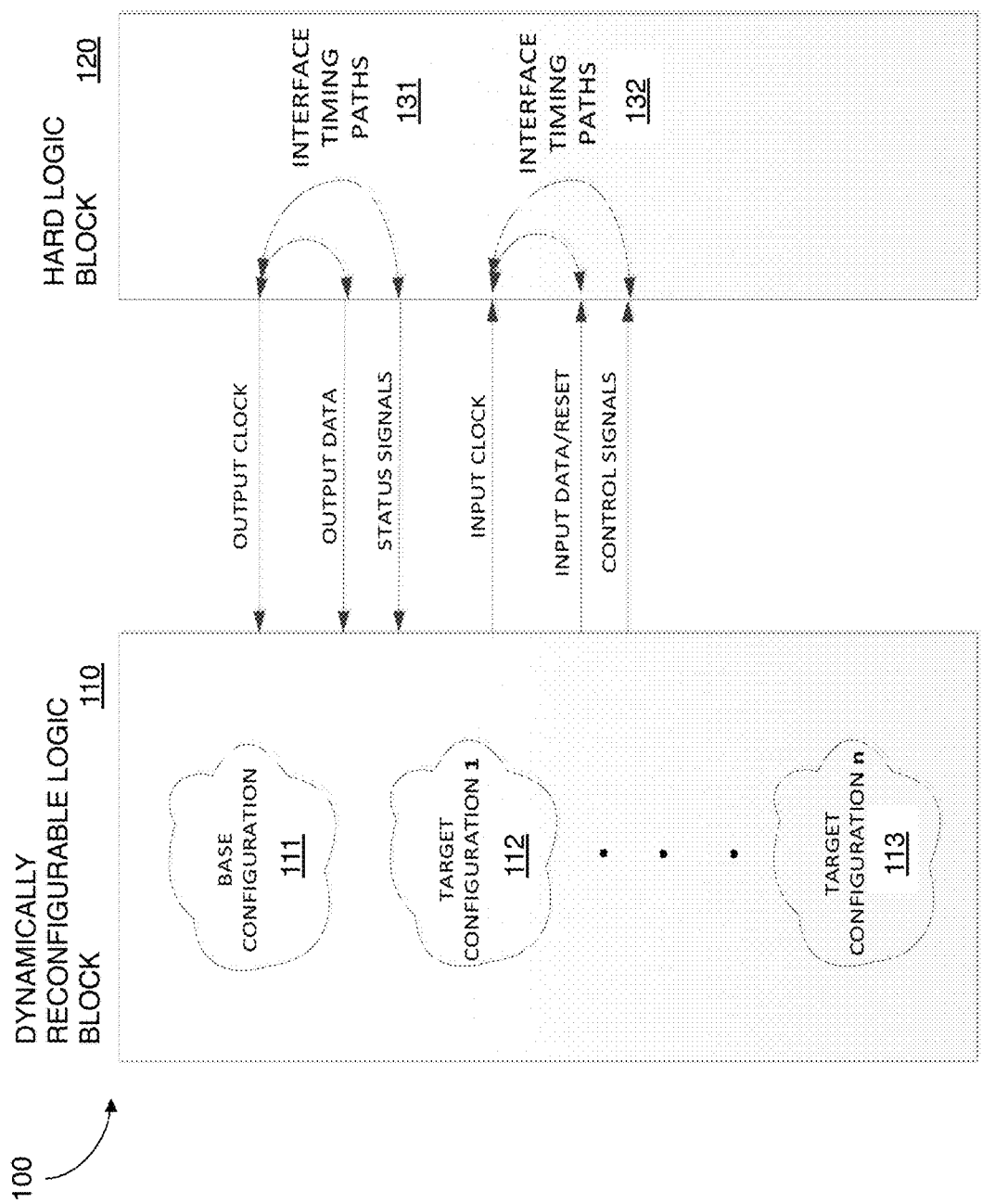
FIG. 1 is a block diagram that illustrates a section of a target device implementing a dynamically reconfigurable logic block and a hard logic block according to an exemplary embodiment of the present invention.

FIG. 1 is a block diagram that illustrates a section of a target device 100 implementing a dynamically reconfigurable logic block 110 and a hard (static) logic block 120 that is not dynamically reconfigurable according to an exemplary embodiment of the present invention. The components in the dynamically reconfigurable logic block 110 may be used to implement multiple configurations, such as base configuration 111, target configuration 1 112, and target configuration n 113, where n can be any number. Interface timing paths 131 and 132 exist between the dynamically reconfigurable logic block 110 and the hard logic block 120. The interface timing paths 131 and 132 include timing relationships between the output/input clock and the output/input signals between the dynamically reconfigurable logic block 110 and the hard logic block 120. Typically, the interface timing paths for each configuration of the dynamically reconfigurable logic block 120 are unique. According to an embodiment of the present invention, each of the unique interface timing paths for the dynamically reconfigurable logic block 120 are accounted for during hardware description language (HDL) compilation in order to achieve timing closure and to generate an optimal place and route solution.

Figure 2:
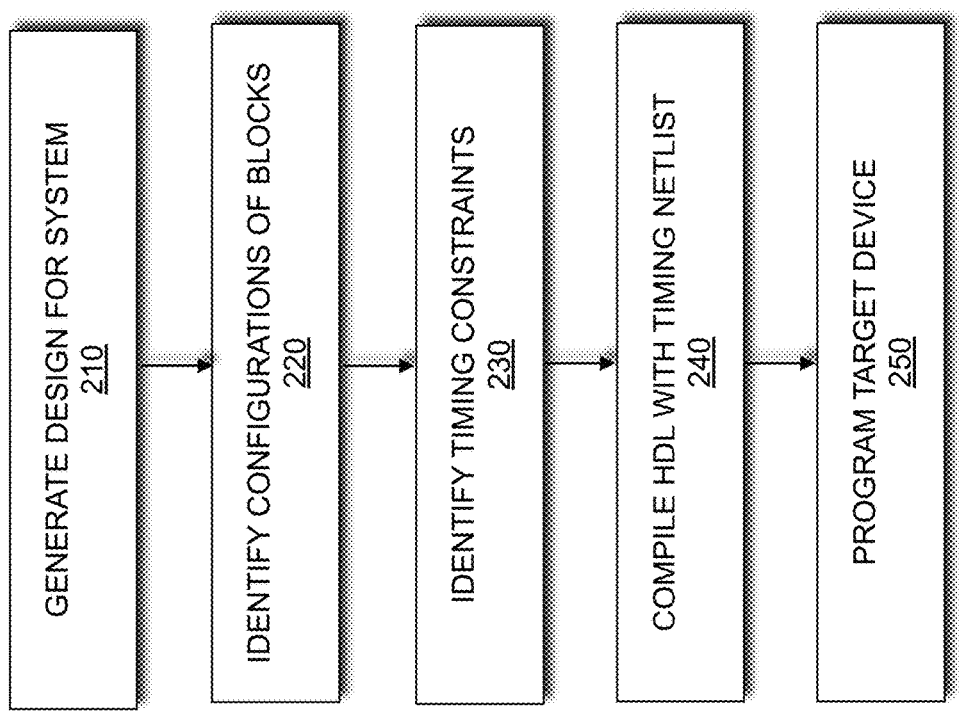
FIG. 2 is a flow chart illustrating a method for designing a system on a target device according to an exemplary embodiment of the present invention.

FIG. 2 is a flow chart illustrating a method for designing a system on a target device according to an exemplary embodiment of the present invention. The target device may be a field programmable gate array (FPGA), application specific integrated circuit (ASIC), a structured ASIC, or other device whose functionality is described by a hardware description language (HDL). According to one embodiment, the procedure illustrated in FIG. 2 may be performed by one or more computer aided design (CAD)/electronic design automation (EDA) tools implemented on a computer system.

At 210, a design for a system is generated. According to an embodiment of the present invention, the design is generated in response to input provided by a user. In this embodiment, the user may input a register-transfer-level (RTL) description of the system, select and connect logic from a library, or utilize other design input options. The design for the system generated may be in HDL and may include a plurality of dynamically reconfigurable logic blocks.

At 220, configurations for dynamically reconfigurable logic blocks are identified. The configurations describe the base configuration logic, which is the initial run time configuration, and all target configuration logic which may follow after dynamic reconfiguration. The configurations for the dynamically reconfigurable logic blocks may be identified by information provided by a user through a graphical user interface, directives in the RTL description of the system, information in HDL parameters, information in external files, compiler arguments, and/or other techniques and mechanisms.

At 230, timing constraints for the system are identified. According to an embodiment of the present invention, timing constraints are identified for hard blocks which are not dynamically reconfigurable logic blocks, base configurations for dynamically reconfigurable logic blocks, and target configurations for the dynamically reconfigurable logic blocks. The timing constraints correspond to timing requirements for the system. The timing constraints may specify an operational clock frequency, setup and hold time requirements, minimum and maximum delays between components, skew requirements, and/or other timing requirements.

At 240, HDL is compiled with a timing netlist into a program file. According to an embodiment of the present invention, HDL compilation involves performing synthesis, placement, routing, and timing analysis on the HDL. The timing netlist reflects timing delays of the base configuration of dynamically reconfigurable logic blocks in the system, all target configurations of the dynamically reconfigurable logic blocks in the system, and timing delays of hard (static) logic blocks. The timing netlist may be generated during HDL compilation or prior to HDL compilation.

At 250, the target device is programmed using the program file to implement the system. According to an embodiment of the present invention, programming the target device physically transforms the target device into the system.

Figure 3:
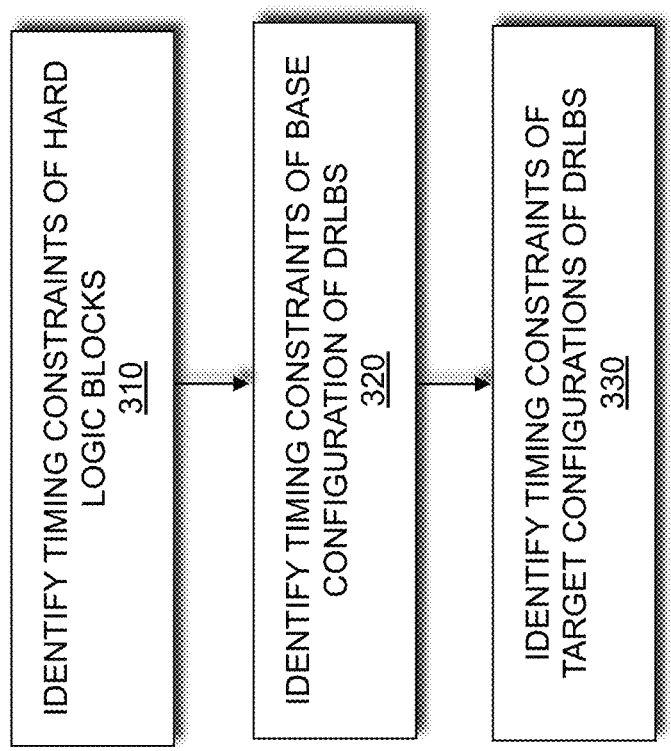
FIG. 3 is a flow chart illustrating a method for identifying timing constraints of a system according exemplary embodiment of the present invention.

FIG. 3 is a flow chart illustrating a method for identifying timing constraints of a system according exemplary embodiment of the present invention. According to an embodiment of the present invention, the procedures shown in FIG. 3 may be used to implement procedure 220 shown in FIG. 2.

At 310, timing constraints of hard logic blocks are identified. For each clock in the hard logic block, a clock is created for every target phase, duty cycle, and frequency combination. The clock may be created using information from the user's specified base and target configurations. The clock may be created using information provided directly by the user.

At 320, timing constraints of base configurations of dynamically reconfigurable logic blocks are identified. For each reconfigurable clock in the design, a clock is created with the phase, duty cycle, and frequency combination applicable to the base configuration. The clock may be created using information provided by the user.

At 330, timing constraints of target configurations of dynamically reconfigurable logic blocks are identified. For each reconfigurable clock in the design, clocks are created with the phase, duty cycle, and frequency combination applicable to each target configuration. The clock may be created using information provided by the user. According to an embodiment of the present invention, the user specifies information about all intended configurations of the dynamically reconfigurable logic blocks. Output clock frequencies on different clock ports are computed and timing constraints are identified using the information. False path and exclusive clock group constraints may also be utilized to restrict specific interface registers to clocks associated only with specific configurations.

Figure 4:
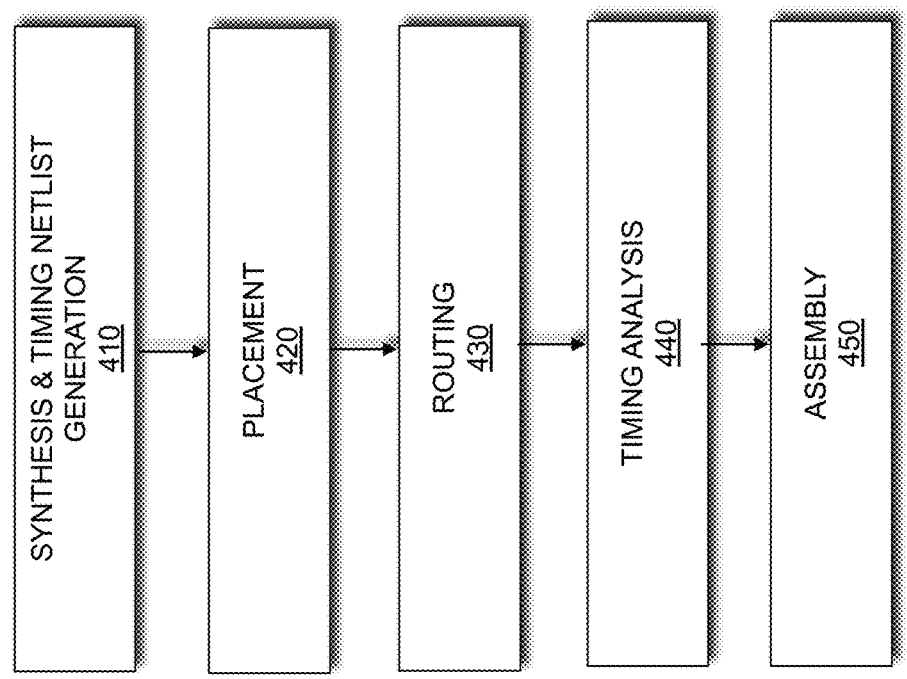
FIG. 4 is a flow chart illustrating a method for performing hardware description language compilation with a timing netlist according to an exemplary embodiment of the present invention.

FIG. 4 is a flow chart illustrating a method for performing HDL compilation according to an embodiment of the present invention. According to an embodiment of the present invention, the procedures illustrated in FIG. 4 may be used to implement procedure 240 shown in FIG. 2.

At 410, the system is synthesized and a timing netlist is generated. Synthesis includes generating a logic design of the system to be implemented by the target device. According to an embodiment of the present invention, synthesis generates an optimized logical representation of the system from an HDL design definition. Synthesis also includes mapping the optimized logic design. Mapping includes determining how to implement logic gates and logic elements in the optimized logic representation with specific resources on the target device such as logic elements and functional blocks.

A timing netlist is generated. The timing netlist reflects timing delays and timing relationships of the base configuration of dynamically reconfigurable logic blocks in the system, timing delays and timing relationships of all target configurations of the dynamically reconfigurable logic blocks in the system, and timing delays and timing relationships of a configuration of hard logic blocks. The timing delays include delays associated with components and interconnections on paths (timing paths) through the base configuration and target configurations of dynamically reconfigurable logic blocks, and through the configuration of hard logic blocks. According to an embodiment of the present invention, a data structure is built which includes attributes of each configuration of each dynamically reconfigurable logic block. The data structure includes timing paths based on information of each configuration of the dynamically reconfigurable logic blocks provided by the user through a graphical user interface, directives in an RTL description of the system, information in HDL parameters, information in external files, compiler arguments, and/or by using other techniques and mechanisms. It should be appreciated that the timing netlist may be generated during synthesis or prior to HDL compilation.

According to an embodiment of the present invention, a logic netlist is generated from mapping during synthesis. This netlist may be an optimized technology-mapped netlist generated from the HDL. The logic netlist may identify resources utilized in a target and interconnections between ports of the resources.

At 420, the system is placed. According to an embodiment of the present invention, placement involves placing the mapped logical system design on the target device. Placement works on the technology-mapped netlist to produce a placement for each of the logic elements and functional blocks. According to an embodiment of the present invention, placement includes fitting the system on the target device by determining which resources on the target device are to be used to implement the logic elements and functional blocks identified during synthesis. Placement may include clustering which involves grouping logic elements together to form the logic clusters present on the target device. According to an embodiment of the present invention, clustering is performed at an early stage of placement and occurs after synthesis during the placement preparation stage. Placement may also minimize the distance between interconnected resources to meet timing constraints of the timing netlist.

At 430, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design. Timing optimization may also be performed during routing to allocate routing resources to meet the timing constraints of the timing netlist.

At 440, timing analysis is performed on the system designed by procedures 410, 420, and 430. According to an embodiment of the present invention, the timing analysis determines whether timing constraints of the system are satisfied. As part of timing analysis, slack analysis may be performed. It should be appreciated that the timing analysis may be performed during each of the synthesis 420, placement 430, and routing procedures 440 to guide compiler optimizations.

At 450, an assembly procedure is performed. The assembly procedure involves creating a program file that includes information determined by the procedures described at 410, 420, 430, and 440. The program file may be a bit stream that may be used to program a target device. According to an embodiment of the present invention, the procedures illustrated in FIG. 4 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. The target device may be programmed with the data file. By programming the target with the data file, components on the target device are physically transformed to implement the system.

Figure 5:
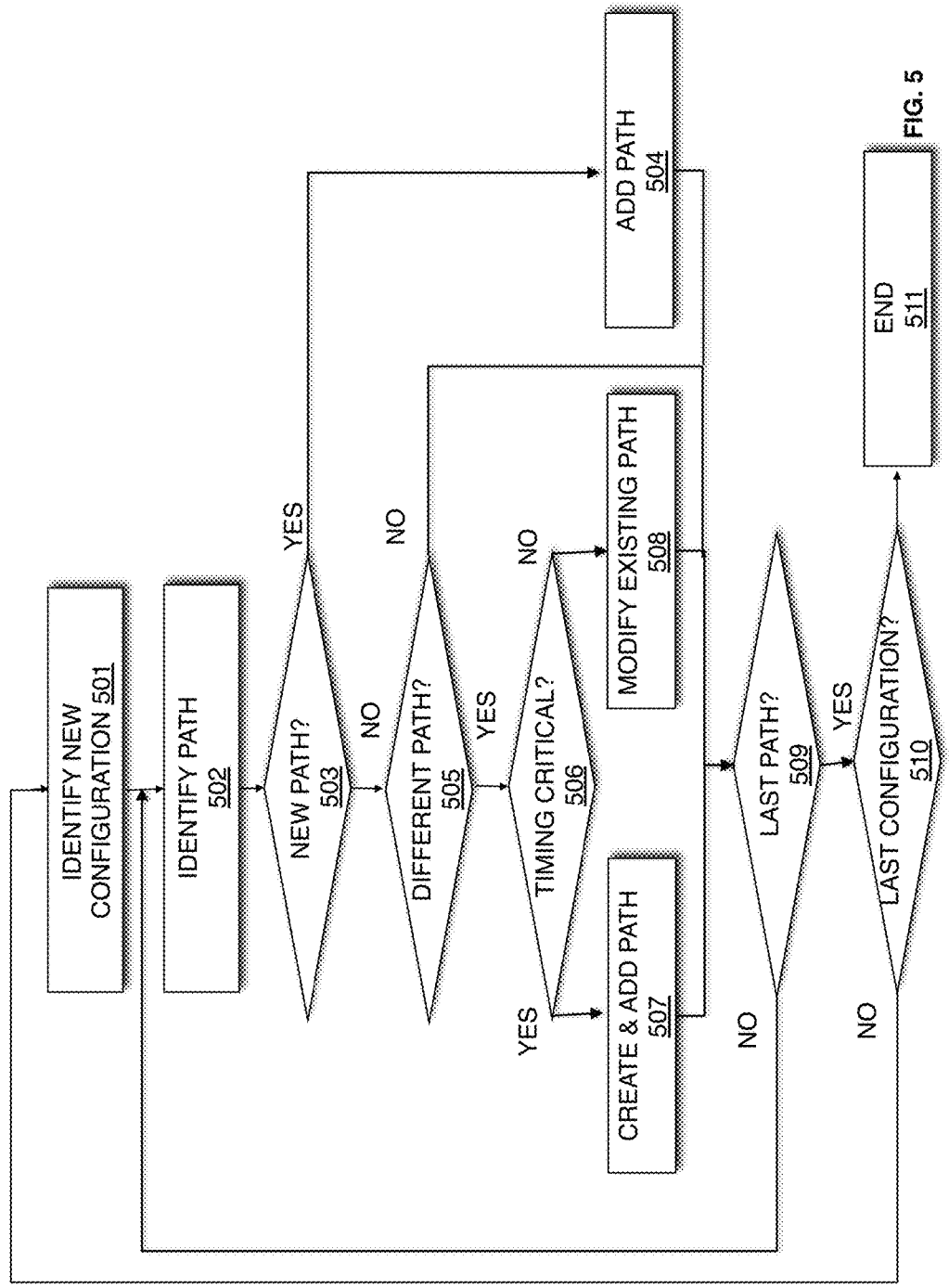
FIG. 5 illustrates a method for generating a timing netlist according to an exemplary embodiment of the present invention.

FIG. 5 illustrates a method for generating a timing netlist according to an exemplary embodiment of the present invention. According to an embodiment of the present invention, the procedures illustrated in FIG. 5 may be used to implement procedure 410 (shown in FIG. 4) in part. The timing netlist reflects timing delays and timing relationships of a base configuration of a block in a system and target configurations of the block in the system. The timing netlist identifies delays and timing relationships associated with components and interconnects on timing paths through the block during base configurations and target configurations. The timing netlist may also reflect timing delays and timing relationships of a configuration in hard logic blocks.

At 501, a new configuration of a block is identified. A configuration of a block is considered to be new if it has not been previously been analyzed in the procedure described in FIG. 5. The configuration identified may be a base configuration of the block which is the initial run time configuration. Alternatively, the configuration may be a target configuration that follows after dynamic reconfiguration. The configurations of a block may be identified from information received at procedures 210 and 220 described with reference to FIG. 2.

At 502, a path in the configuration is identified. According to an embodiment of the present invention, the path identified is either a timing delay path which traverses one or more interconnect resources and components, or a timing relationship between two input ports of a device resource. Identifying a timing delay path includes identifying the delays associated with each of the components and interconnect resources traversed by the path. This may be achieved by accessing information about the components and interconnect resources on the path.

At 503, it is determined whether the path is a new path. According to an embodiment of the present invention, a path is new if it is unique with respect to input ports and output ports of all previously analyzed configurations of all blocks.

If the path is new, control proceeds to 504. If the path is not new, control proceeds to 505.

At 504, information associated with the path is added to the timing netlist. The information associate with the path may include the identity of the interconnect resources and components that the path traverses along with the delay along each of the interconnect resources and components traversed.

At 505, it is determined whether the path is different from a previously identified path. According to an embodiment of the present invention, a path may be determined to be different if the interconnect resources or components it traverses is different from the interconnect resources or components traversed by a previously identified path with the same input port and output port. A path may also be determined to be different if the delay it incurs or the timing relationship is different than the previously identified path. If it is determined that the path is different, control proceeds to 506. If it is determined that the path is not different, control proceeds to 509.

At 506, it is determined whether timing on the path is critical. According to an embodiment of the present invention, critical timing paths are paths having a delay amount that affects optimization results due to timing constraints. If it is determined that timing on the path is critical, control proceeds to 507. If it is determined that timing on the path is not critical, control proceeds to 508.

At 507, a new timing path is created and information associated with the path is added to the timing netlist. According to an embodiment of the present invention, a new name may be provided for the path, components, and/or interconnects on the path to distinguish the path from other paths to the user. The information associated with the path that is added to the timing netlist may include the identity of the interconnect resources and components that the path traverses along with the delay along each of the interconnect resources and components traversed.

At 508, a previously existing path in the timing netlist is modified. According to an embodiment of the present invention, if two paths having the same input and output ports have different timing characteristics, a minimum and maximum timing characteristic of the existing path in the timing netlist may be modified to reflect a worst case for timing analysis. For example, a lower register clock delay of two configurations may be designated as the minimum clock delay, and a greater clock delay of the two configurations may be designated as a maximum clock delay.

At 509, it is determined whether the last path in the configuration of the block has been analyzed. If the last path has not been analyzed, control returns to 502. If the last path has been analyzed, control proceeds to 510.

At 510, it is determined whether the last configuration of the block has been analyzed. If the last configuration of the block has not been analyzed control returns to 501. If the last configuration of the block has been analyzed control proceeds to 511. FIG. 5 illustrates a procedure for generating a timing netlist that reflects timing delays of a base configuration of a block in a system and target configurations of a block in the system. It should be appreciated that the procedure may be iterated and applied to each block of logic in the system such that the timing netlist reflects the timing delays of all the configurations of every block of logic in a system.

In the past, EDA design tools were only aware of the interface timing paths of the base configuration of dynamically reconfigurable logic blocks and had no knowledge of other interface timing paths corresponding to target configurations which may include timing delays and paths not present in the base configuration. As a result, proper timing closure for all intended configurations of the dynamically reconfigurable logic block was not achieved. In addition, an optimal place and route solution for the target configurations was not guaranteed.

Implementing dynamically reconfigurable logic blocks in a target device presents a unique challenge for achieving timing closure. Embodiments of the present invention achieve timing closure of dynamically reconfigurable logic and other portions of the system. Compilation accounts for timing requirements between logic blocks in the target device and with port delays and relationships (e.g., timing paths).

As described, embodiments of the present invention generate a timing netlist that reflects the delays and timing relationships of paths for all configurations of dynamically reconfigurable logic in a system. This comprehensive timing netlist is used to perform a compilation of a system. This allows for precise timing closure to be performed on dynamically reconfigurable logic blocks in a single compilation. This offers an improvement over prior approaches for addressing timing closure on systems that implemented dynamically reconfigurable logic blocks, including approaches performing over-constraining and multiple compilation.

Approaches performing over-constraining attempted to account for timing delays for all intended configurations by applying pessimism to timing closure. Over-constraining may involve creating extra clocks on a dynamically reconfigurable logic block's output clock ports for target configurations, creating extra clock uncertainty on the dynamically reconfigurable logic block's interface clocks that feed a programmable core fabric, creating uncertainty on transfers to and from core logic, and cutting paths in the core logic that should not be timing analyzed for configurations of interest. Although taking a pessimistic timing closure approach accounted for some timing delays in a configuration, it often omitted needed timing paths for signals that are used under one configuration, but not another. This resulted in an incomplete timing analysis.

The multiple compilation approach involved compiling a design multiple times for each target configuration. After performing an HDL compilation for a base configuration of all dynamically reconfigurable logic blocks, the placement of the base configuration is locked. The dynamically reconfigurable logic blocks were then modified to reflect a target configuration and a subsequent HDL compilation was performed with the locked placement to achieve timing closure. This was iterated until a placement solution was found to accommodate all configurations of the dynamically reconfigurable logic blocks. This approach required a significant amount of time and still did not guarantee an optimal working solution.

By generating a timing netlist that reflects the delays of paths for all configurations of dynamically reconfigurable logic in a system, and utilizing this comprehensive timing netlist to perform a compilation of a HDL of the system, precise timing closure may be achieved on a system utilizing dynamically reconfigurable logic blocks in a single pass/iteration of HDL compilation. This offers an improvement over prior approaches by presenting a compiler with all actual timing delays and requirements initially, rather than in stages after other solutions have already been locked down. Furthermore, this approach reduces the design time required for multiple compilations.

FIGS. 2-5 are flow charts that illustrate embodiments of the present invention. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 6:
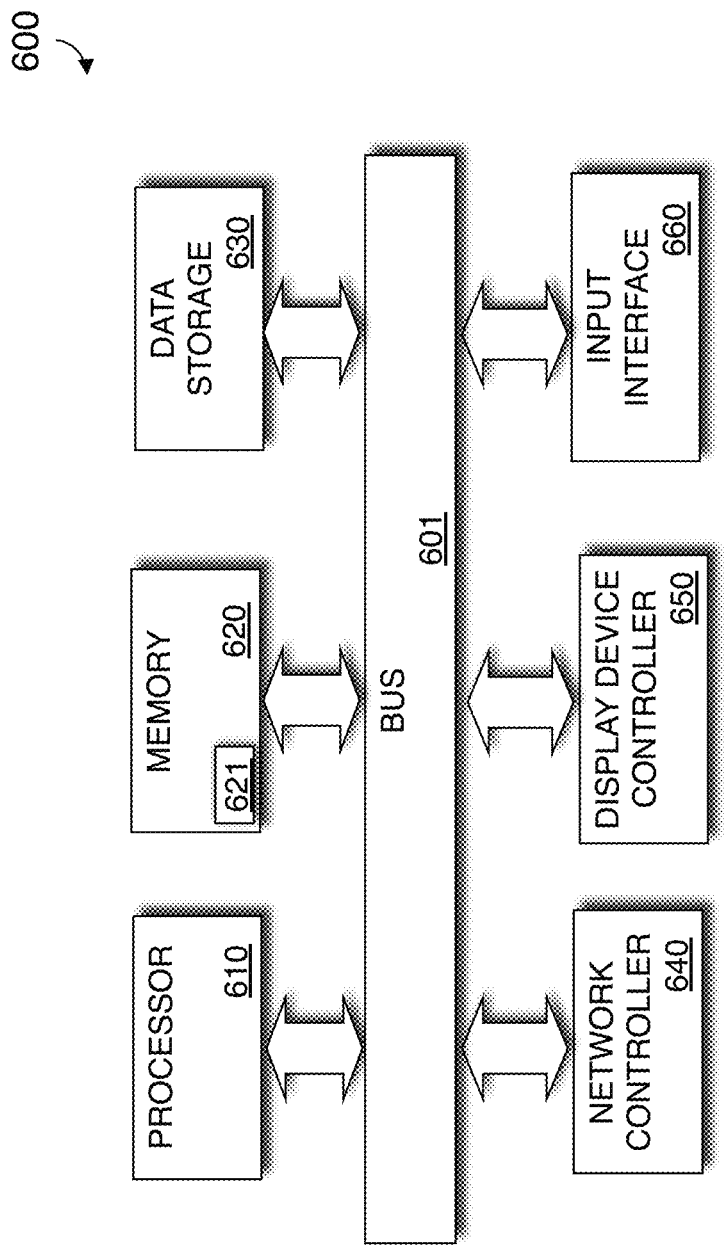
FIG. 6 illustrates a block diagram of a computer system implementing a system designer according to an exemplary embodiment of the present invention.

FIG. 6 is a block diagram of an exemplary computer system 600 in which an example embodiment of the present invention resides. The computer system 600 includes a processor 610 that process data signals. The processor 610 is coupled to a bus 601 or other switch fabric that transmits data signals between processor 610 and other components in the computer system 600. The computer system 600 includes a memory 620. The memory 620 may store instructions and code represented by data signals that may be executed by the processor 610. A data storage device 630 is also coupled to the bus 601.

A network controller 640 is coupled to the bus 601. The network controller 640 may link the computer system 600 to a network of computers (not shown) and supports communication among the machines. A display device controller 650 is coupled to the bus 601. The display device controller 650 allows coupling of a display device (not shown) to the computer system 600 and acts as an interface between the display device and the computer system 600. An input interface 660 is coupled to the bus 601. The input interface 660 allows coupling of an input device (not shown) to the computer system 600 and transmits data signals from the input device to the computer system 600.

A system designer 621 may reside in the memory 620 and be executed by the processor 610. The system designer 621 may operate to generate a timing netlist that reflects timing delays of a base configuration of a dynamically reconfigurable logic block in a system and one or more target configurations of the dynamically reconfigurable logic block in the system. The system design is also operable to perform synthesis, placement, and routing on the system in response to the timing netlist.

Figure 7:
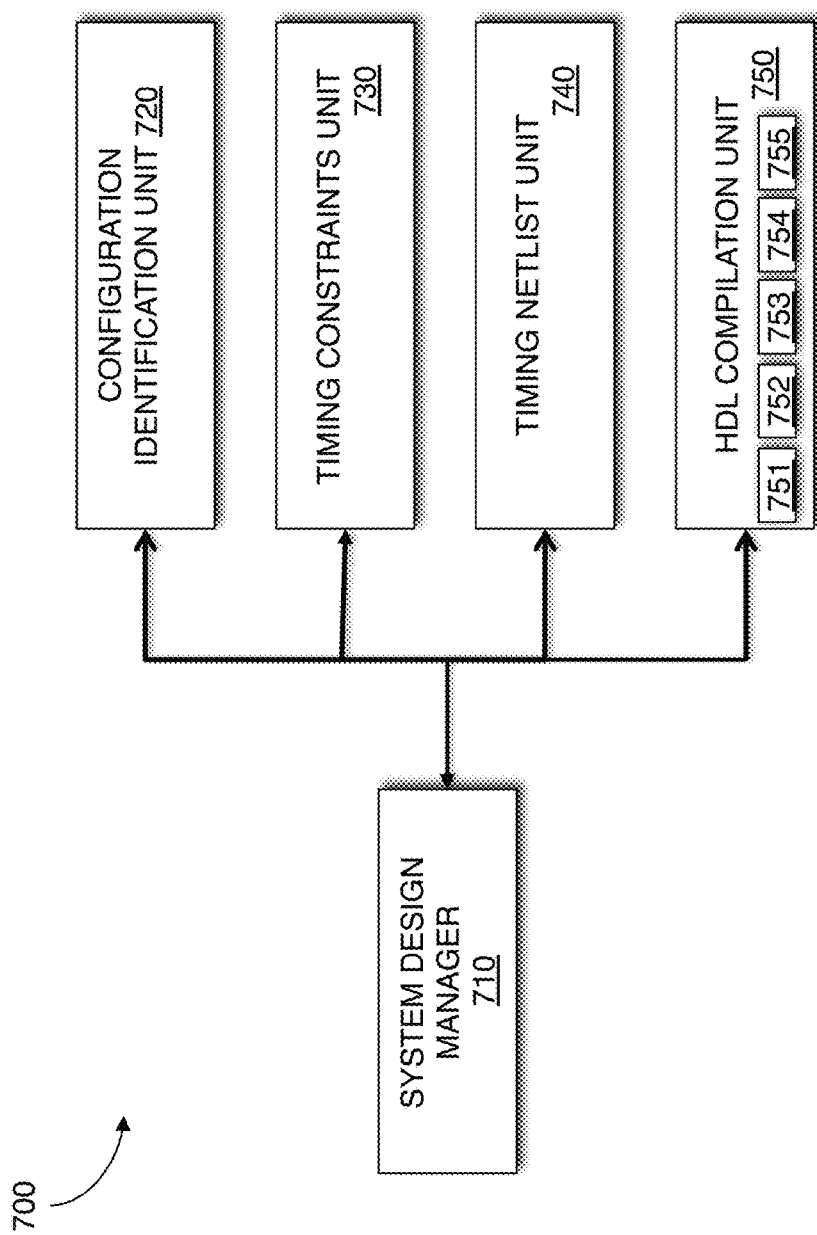
FIG. 7 is a block diagram of a system designer according to an exemplary embodiment of the present invention.

FIG. 7 illustrates a system designer 700 according to an embodiment of the present invention. The system designer 700 may be an EDA tool for designing a system on a target device such as an FPGA, structured application-specific integrated circuit (ASIC), ASIC, or other circuitry. FIG. 7 illustrates modules implementing an embodiment of the system designer 700. According to one embodiment, the modules represent software modules and system design may be performed by a computer system such as the one illustrated in FIG. 6 executing sequences of instructions represented by the modules shown in FIG. 7. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 700 includes a designer manager 710. The designer manager 710 is connected to and transmits data between the components of the system designer 700.

The system designer 700 includes a configuration identification unit 720. The configuration identification unit 720 identifies configurations for dynamically reconfigurable logic blocks in a system. The configurations describe a base configuration logic, which is the initial run time configuration, and all target configuration logic which may follow after dynamic reconfiguration. The configuration identification unit 720 may identify configurations for the dynamically reconfigurable logic blocks by information provided by a user through a graphical user interface, by directives in the RTL description of the system, information in HDL parameters, information in external files, compiler arguments, or by using other techniques and mechanisms.

The system designer 700 includes a timing constraints unit 730. The timing constraints unit 730 identifies timing constraints for the system. According to an embodiment of the present invention, the timing constraints unit 730 identifies timing constraints for hard blocks which are not dynamically reconfigurable logic blocks, base configurations for dynamically reconfigurable logic blocks, and target configurations for the dynamically reconfigurable logic blocks. The timing constraints correspond to timing requirements for the system. The timing constraints may specify an operational clock frequency, setup and hold time requirements, minimum and maximum delays between components, skew requirements, and/or other timing requirements. According to an embodiment of the present invention, the timing constraints unit 730 may perform the procedures described with reference to FIG. 3 to identify the timing constraints for the system. It should be appreciated that the system designer may operate with or without the timing constraints unit 730.

The system designer 700 includes a timing netlist unit 740. The timing netlist unit 740 generates a timing netlist that reflects timing delays and timing relationships of the base configuration of dynamically reconfigurable logic blocks in the system and all target configurations of the dynamically reconfigurable logic blocks in the system. The timing netlist may also reflect timing delays and timing relationships of the configurations of hard logic blocks. The timing delays include delays associated with components and interconnects on paths (timing paths) through the base configuration and paths through the target configurations of dynamically reconfigurable logic blocks. According to an embodiment of the present invention, the timing netlist unit 740 builds a data structure which includes attributes of each configuration of each dynamically reconfigurable logic block. The data structure includes timing paths based on information of each configuration of the dynamically reconfigurable logic blocks provided by the user through a graphical user interface, by directives in an RTL description of the system, information in HDL parameters, information in external files, compiler arguments, or by using other techniques or mechanisms. It should be appreciated that the timing netlist unit 740 may generate the timing netlist during HDL compilation or prior to HDL compilation. According to an embodiment of the present invention, the timing netlist unit 740 may perform the procedures described with reference to FIG. 5 to generate the timing netlist for the system.

The system designer 700 includes a HDL compilation unit 750 that performs HDL compilation on the design for the system. Procedures performed during HDL compilation may be performed in response to the timing netlist generated by the timing netlist unit 740. This allows the procedures to take into account the various configurations of dynamically reconfigurable logic blocks. The HDL compilation unit 750 includes a synthesis unit 751 that generates a logic design of a system to be implemented on the target device. According to an embodiment of the system designer 700, the synthesis unit 751 takes a conceptual HDL design definition and generates an optimized logical representation of the system. The optimized logical representation of the system generated by the synthesis unit 751 may include a representation that has a reduced number of functional blocks and registers, such as logic gates and logic elements, required for the system. Alternatively, the optimized logical representation of the system generated by the synthesis unit 751 may include a representation that has a reduced depth of logic and that generates a lower signal propagation delay.

The synthesis unit 751 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing (DSP) blocks, input output (JO) elements or other components.

The HDL compilation unit 750 includes a placement unit 752 that processes the optimized technology-mapped netlist to produce a placement for each of the functional blocks. The placement identifies which components or areas on the target device are to be used for specific functional blocks and registers.

The HDL compilation unit 750 includes a routing unit 753 that determines the routing resources on the target device to use to provide interconnection between the components implementing functional blocks and registers of the logic design.

The HDL compilation unit 750 includes a timing analysis unit 754 that performs timing analysis to determine whether timing constraints of the system are satisfied. The timing analysis unit 754 may generate report files which identify the area required for implementing the system on the target device, the largest slack value for a path in a section of the system, and other statistics.

The HDL compilation unit 750 includes an assembly unit 755 that performs an assembly procedure that creates a data file that includes the design of the system generated by the system designer 700. The data file may be a bit stream that may be used to program the target device. The assembly unit 755 may output the data file so that the data file may be stored or alternatively transmitted to a separate machine used to program the target device. It should be appreciated that the assembly unit 755 may also output the design of the system in other forms such as on a display device or other medium.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 8:
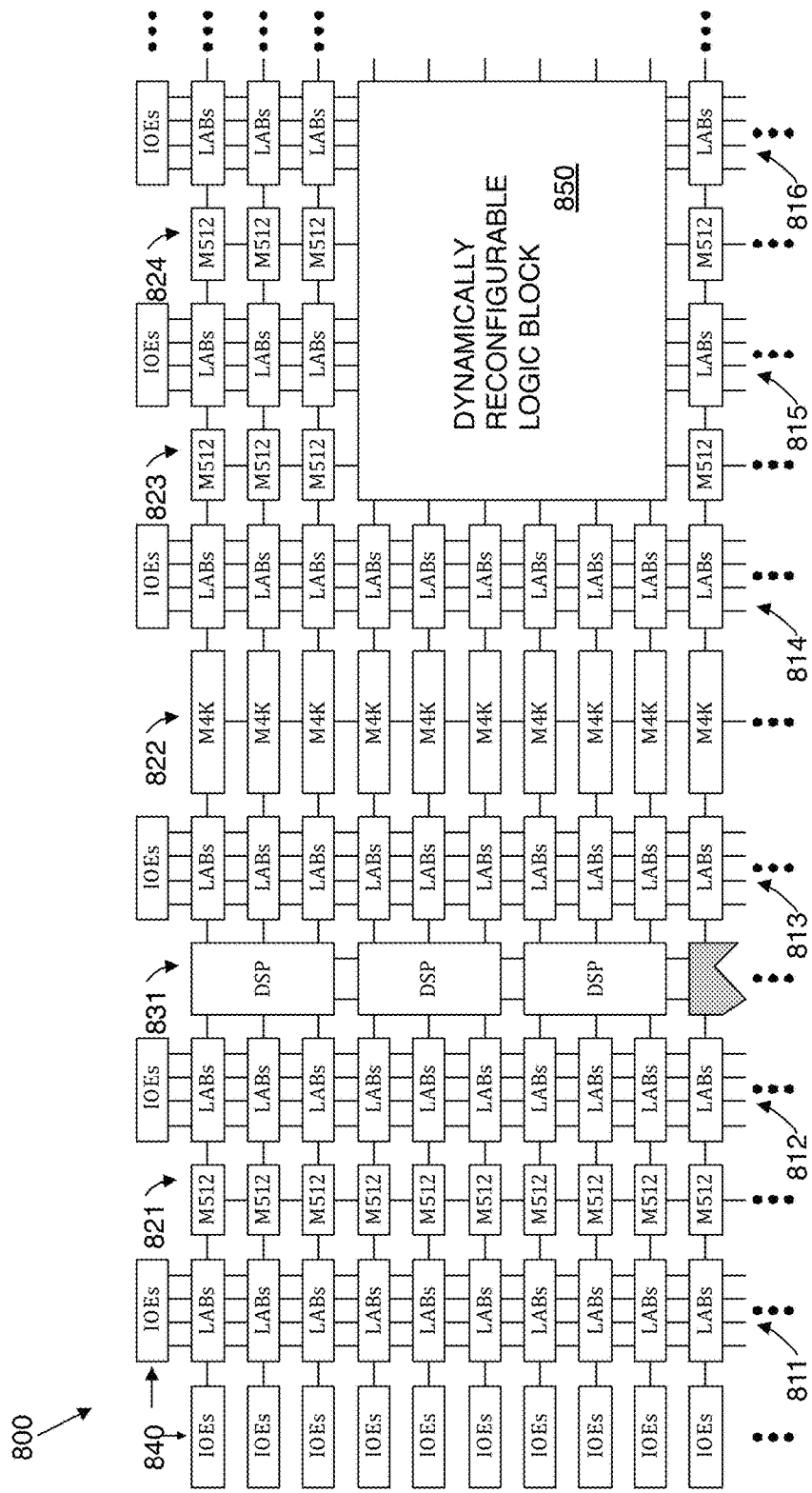
FIG. 8 illustrates an exemplary target device according to an exemplary embodiment of the present invention.

FIG. 8 illustrates a device 800 that may be used to implement a target device according to an embodiment of the present invention. The device 800 is a field programmable gate array (FPGA) that includes a plurality of logic-array blocks (LABs). According to an embodiment of the present invention, the device 800 may be implemented on a single integrated circuit. Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 800. Columns of LABs are shown as 811-816. It should be appreciated that the logic block may include additional or alternate components.

The device 800 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 800. Columns of memory blocks are shown as 821-824.

The device 800 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 800 and are shown as 831.

The device 800 includes a plurality of input/output elements (IOEs) 840. Each IOE feeds an IO pin (not shown) on the device 800. The IOEs 840 are located at the end of LAB rows and columns around the periphery of the device 800. Each IOE may include a bidirectional IO buffer and a plurality of registers for registering input, output, and output-enable signals.

The device 800 may include routing resources such as LAB local interconnect lines, row interconnect lines ("H-type wires"), and column interconnect lines ("V-type wires") (not shown) to route signals between components on the target device.

The device 800 includes a dynamically reconfigurable logic block 850. Although device 800 is illustrated with a single dynamically reconfigurable logic block 850, it should be appreciated that additional dynamically reconfigurable logic blocks may also be implemented on the device 800. The dynamically reconfigurable logic block 850 includes a plurality of components that may be programmed to perform a variety of functionalities. The dynamically reconfigurable logic block 850 is modifiable to perform alternative functionalities after other parts of the system have been programmed and are operating. The dynamically reconfigurable logic block 850 may be used to implement a transceiver, a memory interface, a phase locked loop, or other components. In one implementation, the dynamically reconfigurable logic block 850 may be initially programmed to implement a transceiver that supports a first protocol when operating in a first configuration, and reconfigured to implement a transceiver that supports a second protocol when operating in a second configuration. It should be appreciated that the dynamically reconfigurable logic block 850 may be implemented with one or more LABs, RAMs, DSPs, memory interfaces, I/Os, and/or other component that is dynamically reconfigurable.

FIG. 9A illustrates a dynamically reconfigurable logic block 910 and its associated configuration registers 920 according to an exemplary embodiment of the present invention. The dynamically reconfigurable logic block 910, labeled "IP Core", may be used to implement the dynamically reconfigurable logic block 850 illustrated in FIG. 8. The dynamically reconfigurable logic block 910 includes circuitry that is programmable to implement a variety of functions according to settings of configuration registers 920. Configuration registers 920 include twelve settings which may be selected to be either high/low (on/off), each of the settings representing a different programmable feature of the dynamically reconfigurable logic block 910.

FIG. 9B illustrates different configurations of a dynamically reconfigurable logic block. A first setting of configuration registers 920A illustrate that five registers represented as filled circles are set high while seven registers are set low. This first setting of configuration registers 920B effectuates programming a first configuration of dynamically reconfigurable logic block 910B to include a single input and two outputs. A second setting of configuration registers 920B illustrate that three registers represented as filled circles are set high while nine registers are set low. This second setting of configuration registers 920B effectuates programming a second configuration of dynamically reconfigurable logic block 910B to include two bi-directional ports. It should be appreciated that the register settings may also be selected to effectuate a different operating frequency of the logic block and the implementation of different features and functionalities between configurations, In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a system on a target device, comprising:
   generating a timing netlist that reflects timing delays and timing relationships of a base configuration of a block in the system and a target configuration of the block in the system, wherein the base configuration of the block and the target configuration of the block implement different functionalities; and
   performing synthesis, placement, and routing on the system implemented on the target device in response to the timing netlist, wherein the block is reconfigurable from the base configuration to the target configuration during runtime of the system.

2. The method of claim 1, wherein the timing netlist identifies timing delays and timing relationships associated with components and interconnects on a first path through the block in the base configuration, and delays and timing relationships associated with components and interconnects on a second path through the block in the target configuration.

3. The method of claim 2, wherein the first path is unique to the base configuration, and the second path is unique to the target configuration.

4. The method of claim 1, further comprising generating timing constraints for the base configuration of the block and the target configuration of the block.

5. The method of claim 4, wherein the timing constraints account for all target phases, duty-cycle, and frequency combinations of each clock in the base configuration of the block and the target configuration of the block.

6. The method of claim 4, wherein the synthesis, placement, and routing on the system is also performed in response to the timing constraints.

7. The method of claim 1, wherein a single iteration of the synthesis, placement, and routing is performed without subsequent iterations.

8. The method of claim 1, wherein all the timing delays and timing relationships in the timing netlist for the base configuration and the target configuration are considered when performing the synthesis, placement, and routing.

9. The method of claim 1, wherein generating the timing netlist comprises:
   adding new paths from each configuration of the block to the timing netlist;
   identifying different paths from each configuration of the block; and
   performing one of treating a different path as a new path, and treating the different path as a pre-existing path and associating a worst case timing for the pre-existing path.

10. The method of claim 9, wherein adding new paths to the timing netlist comprises:
   identifying components and interconnects on each of the new paths;
   identifying delays associated with the components and the interconnects; and
   storing information about the components, interconnects, and delays in the timing netlist.

11. The method of claim 1 further comprising identifying all configurations of the block.

12. The method of claim 11, wherein identifying all the configurations of the block comprises retrieving information provided by a designer.

13. The method of claim 11, wherein identifying all the configurations of the block comprises retrieving information in a hardware description language (HDL) file.

14. A non-transitory computer readable medium including a sequence of instructions stored thereon for causing a computer to execute a method for designing a system on a target device, comprising:
   adding new paths from each configuration of a block to a timing netlist;
   identifying different paths from each configuration of the block;

performing one of treating a different path as a new path, and treating the different path as a pre-existing path and associating a worst case timing for the pre-existing path; and performing synthesis, placement, and routing on the system implemented on the target device in response to the timing netlist.

15. The non-transitory computer readable medium of claim 14, wherein adding the new paths to the timing netlist comprises:

identifying components and interconnects on each of the new paths;

identifying delays associated with the components and the interconnects; and storing information about the components, interconnects, and delays in the timing netlist.

16. A system designer, comprising:

a configuration identification unit that identifies a base configuration of a block in a system that implements a first functionality, and a target configuration of the block that implements a second functionality, wherein the block is reconfigurable during runtime of the system to implement one of the base configuration and the target configuration;

a timing netlist unit that generates a timing netlist that reflects timing delays and timing relationships of the base configuration of the block and the target configuration of the block; and a hardware description language (HDL) compilation unit that performs synthesis, placement, and routing on the system in response to the timing netlist, wherein at least one of the configuration identification unit, timing netlist unit, and HDL compilation unit is implemented by a processor.

17. The system designer of claim 16, wherein the timing netlist identifies delays and timing relationships associated with components and interconnects on a first path through the block in the base configuration, and delays associated with components and interconnects on a second path through the block in the target configuration.

18. The system designer of claim 16, wherein the timing netlist unit adds new paths from each configuration of a block to the timing netlist, identifies different paths from each configuration of the block, and performs one of treating a different path as a new path, and treating the different path as a pre-existing path and associating a worst case timing for the pre-existing path.

* * * * *